E. B. CARPENTER.
Organ Couplers.
No. 152,599. Patented June 30, 1874.
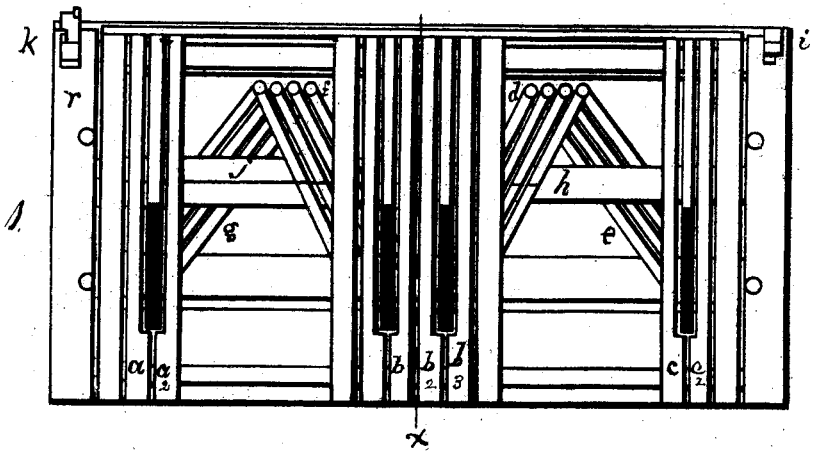
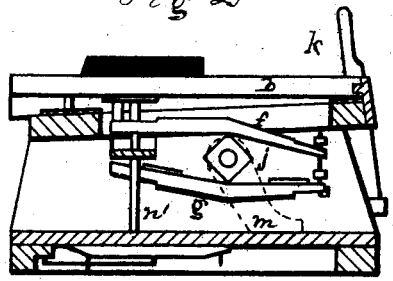 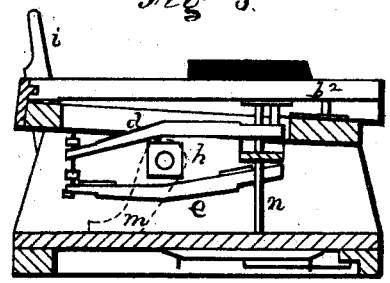
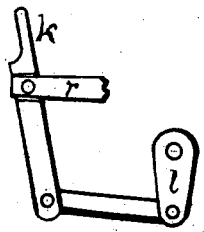 
Witnesses.
O. W. Bond
Wm. J. English
Edwin B. Carpenter
By Mot & Bond Attys
Inventor

UNITED STATES PATENT OFFICE.

EDWIN B. CARPENTER, OF MENDOTA, ILLINOIS.

IMPROVEMENT IN ORGAN-COUPLERS.

Specification forming part of Letters Patent No. 152,599, dated June 30, 1874; application filed March 13, 1874.

*To all whom it may concern:*

Be it known that I, EDWIN B. CARPENTER, of Mendota, La Salle county, Illinois, have invented a new and useful Improvement in Organs and other similar reed instruments, of which the following is a full description, reference being had to the accompanying drawings.

Figure 1 is a top view, showing a part of the keys removed; Fig. 2, a vertical cross-section on line $x$, looking to the left; Fig. 3, a similar section, looking to the right; Fig. 4, a detail, showing a system of levers used in operating the coupler; Fig. 5, a variation, showing the two parts $h\ j$ made of a single piece instead of in two pieces.

This invention relates to reed instruments; and consists in the combination of the levers and stops, and their relative positions, as hereinafter more fully described.

In the drawings, $a\ a^2\ b\ b^2\ c\ c^2$ represent keys of the instrument; $d\ e$, levers connecting two keys, the one an octave above the other; $f\ g$, similar levers connecting the keys next below the given point $x$ with keys an octave below; $h$, a square bar or stop, by the use of which the levers $d\ e$ can be brought into action, or thrown out of action; $j$, a similar bar or stop, by the use of which the levers $f\ g$ can be brought into action, or thrown out of action. The outer ends of both of these parts $h\ j$ are supported in the sides of the instrument, and the inner ends in a bearing, $m$, located within the instrument. The position of this bearing or support is represented by dotted lines in Figs. 2 and 3. The bar or stop $h$ can be operated by a system of levers, as usual, one of which, $i$, is shown in Fig. 3. The bar $j$ can be operated by levers, one of which is shown in Fig. 2. In Fig. 4 I have shown such a system of levers, $k$ being pivoted to $r$, which is a part of the frame, the end of $j$ passing through its bearing, and being connected with $l$. As represented, $b^2$ is connected with the key $c$ an octave above $b^2$ by the levers $d\ e$. The key $b^3$ is connected with $c^2$ by similar levers, and so on through the octave, only a portion of which is shown. But $b$ is connected with $a^2$ an octave below by means of the levers $f\ g$, and so on through the octave, only a portion of which is shown. When $h$ is in the position represented the levers $d\ e$ will not act; but if brought into the position in which $j$ is shown the corners of the bar furnish fulcrums for the levers, as shown in Fig. 2. $n\ n'$ represent two of the rods or pins through which the valves which cover the reeds are operated, or opened by pressing on the keys, as usual.

As represented, and so far described, the two bars $h\ j$ are entirely separate from each other, and either can be operated without the other, so that the levers $f\ g$ can be in use while $d\ e$ will not be in use, as shown in Fig. 1; or $d\ e$ may be in use and $f\ g$ not in use; or both series $d\ e$ and $f\ g$ may be in use at the same time.

This construction enables the player to strengthen either the treble only, or only the base, or both treble and base, at pleasure, thus securing greater variety, and more perfectly adapting the instrument to the expression of different kinds of music.

The advantage of coupling both above and below a given point at the same time can be secured by making the parts $h\ j$ of a single piece, forming a single bar, $s$, as shown in Fig. 5; but when so made the connection cannot be either only above or only below the given point.

A prominent feature of my invention being in connecting an octave-coupler both above and below a given point, my improvement can be used with several reed and wind instruments.

The bellows is not shown.

What I claim as new is as follows:

A series of levers, $d\ e$ and $f\ g$, in combination with the angular stops $h\ j$, constructed and arranged substantially as and for the purpose herein specified.

EDWIN B. CARPENTER.

Witnesses:
HOMER PERCIVAL,
G. H. CARPENTER.